United States Patent

Schott, Jr.

[15] 3,645,659
[45] Feb. 29, 1972

[54] EXTRUDING PLASTIC

[72] Inventor: Charles M. Schott, Jr., Gloucester, Mass.
[73] Assignee: Gloucester Engineering Co., Inc., Gloucester, Mass.
[22] Filed: Mar. 13, 1969
[21] Appl. No.: 806,861

[52] U.S. Cl. .................................... 425/204, 425/378
[51] Int. Cl. .................................................. B29f 3/02
[58] Field of Search .............. 18/12 SV, 12 SI, 12 SJ, 12 ST, 18/12 SZ, 12 SH, 12 SF, 30 JS

[56] References Cited

UNITED STATES PATENTS

| | | | |
|---|---|---|---|
| 2,370,469 | 2/1945 | Johnson | 18/12 SH |
| 3,354,504 | 11/1967 | Lehner | 18/12 SZ |
| 2,641,800 | 6/1953 | Myers | 18/12 ST |
| 3,278,986 | 10/1966 | Welt | 18/12 SV |

*Primary Examiner*—J. Spencer Overholser
*Assistant Examiner*—Norman E. Lehrer
*Attorney*—John Noel Williams

[57] ABSTRACT

An extruder is shown having: cooled screw in the feeder section; rotation retarding means in the barrel of the feeder section in the form of open mouth axial grooves; the vertical arrangement of the extruder with the hopper immersing the cooled portion of the screw with inlet plastic such as flakes of scrap; an extension of the screw into the hopper agitating the flakes and housing water inlet to the feeder; a drive shank at the outlet end isolated by an internal air chamber from the heated extruder; the shank cooled by an inserted cooling member; a sealing member surrounding the shank defining a restricted passage that tapers and accommodates eccentricity; the stationary walls of the surrounding member are grooved, resisting outward leakage of the plastic. These various features are shown to enable feeding of difficult materials and scrap and to achieve a compact, simple, efficient machine.

5 Claims, 6 Drawing Figures

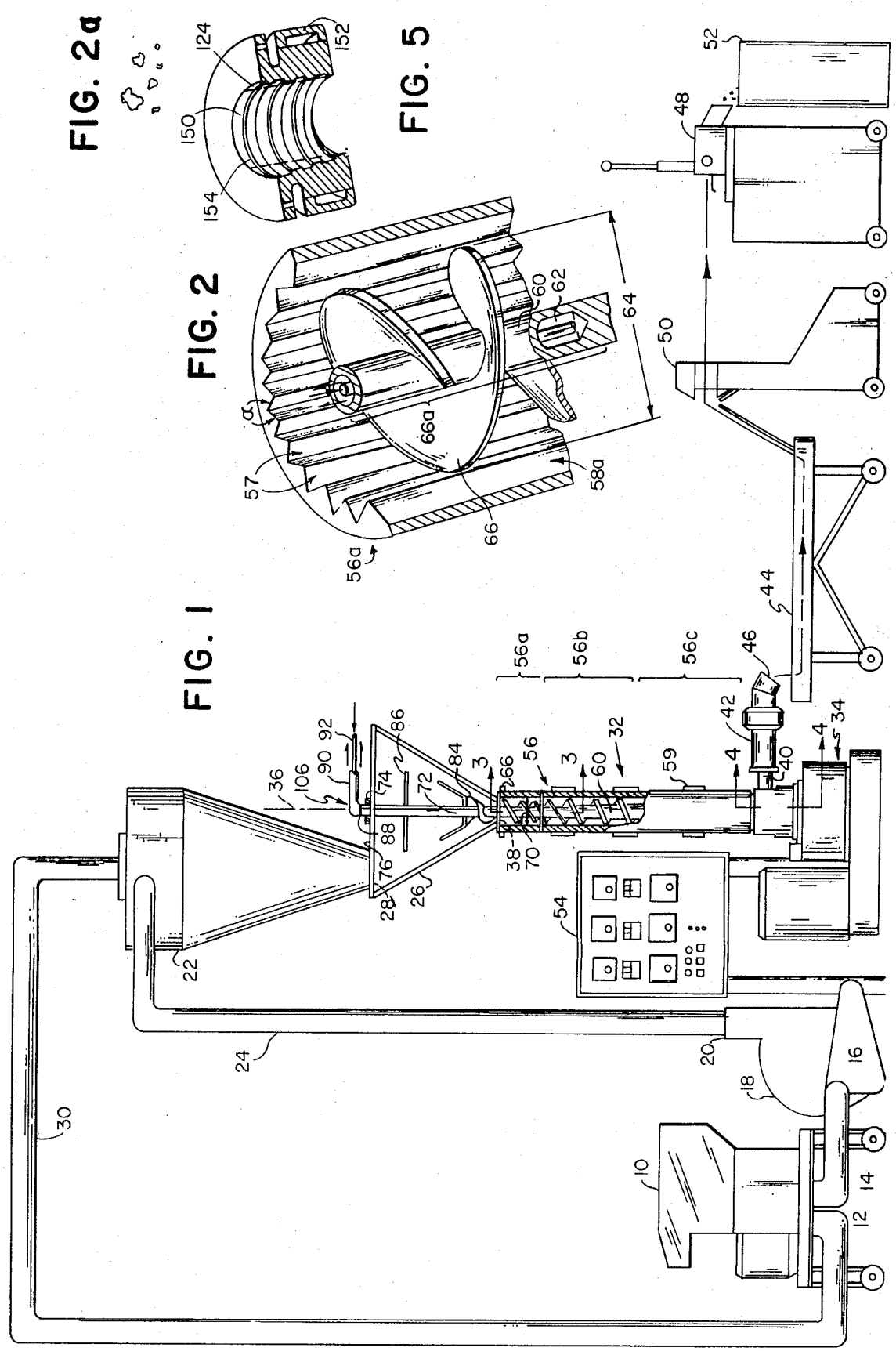

EXTRUDING PLASTIC

This invention relates to the recovery of scrap plastic and to the extrusion of difficult materials generally.

In the plastic film and sheet industry, a substantial percentage of the plastic material consumed becomes scrap or waste for a number of reasons, for example, because of trimmings or nonuniformity of the film. Economical operation of plastic production requires that the scrap be reclaimed, but various difficulties have been encountered, for instance the fluffy and flaky nature of ground scrap plastic film make it difficult to feed into an extruder, requiring complicated and expensive machinery such as hopper stuffers. In addition, some materials, e.g., compounded powders, are difficult to extrude with conventional machines.

It is an object of the invention to provide for reclamation of this scrap material and for extrusion of other materials with apparatus that is simple, inexpensive, reliable, efficient and compact.

Another object of the invention is to provide a scrap extruder which avoids the necessity of a separately driven feeder apparatus or hopper stuffer, but rather is self-feeding even with materials that are difficult to feed such as flakes of film or "fluff."

Still another object is to provide improved extruders of the type driven at the output end.

According to the invention it is realized that with difficult-to-feed particles such as flakes of film the feeding problem is complex and involves not merely the tendency of the flakes to bridge and not flow smoothly from the hopper, but also the tendency to conglomerate and turn with the first part of the screw, thus failing to move axially.

It is realized according to the invention that the relatively small amount of heating that is involved in the initial region of the operating extruder screw due to friction or conduction from other parts of the extruder has an extremely detrimental effect, and that means for cooling the initial screw portion, even if removing only a small amount of heat, makes the difference between success and failure in the feeding of various materials. It is believed that this cooling of the screw surface prevents the mass of plastic from becoming sticky at its immediate interface with the screw surface and significantly decreases the frictional or mechanical coupling of the plastic with the rotating screw surface.

It is also realized that rotation retarding means on the inner surface of the initial extruder barrel, particularly if made self-cleaning, is effective to counter detrimental rotation of the inlet mass. Combination of this rotation retarding with initial cooling of the screw leads to successful feeding of materials that have a wide range of physical characteristics, as result from varying size of the particles, and varying height of the material in the hopper, and varying electrostatic charge between particles. Particularly effective rotation retarding means are provided by grooves which extend along the length of the barrel and decrease in cross-sectional area in the direction outward from the axis of the barrel. These are simply provided by planar groove walls intersecting at substantial angles.

As an extremely successful extruder, the invention features initial screw cooling and rotation retarding means as above described in an extruder of upwardly extending configuration. This leads to immersion of the inlet portion of the screw, resulting in uniform action of the initial cooling and retarding of rotation.

The invention also features an upward extension of the screw into the hopper, with agitating means driven by the screw itself, combating bridging of the particles or flakes without need of separately driven apparatus. Introduction of the cooling liquid through this extension not only provides effective initial cooling of the screw with avoidance of detrimental cooling of the transition zone; it also can combat transmission of heat and detrimental softening of the plastic in the hopper.

The invention also presents features which permit an exceedingly compact extruder to be achieved. The initial cooling described above is one feature leading to this result. Another feature, employing drive of the screw from the output end, is the definition of an air chamber in the screw itself, outward of the outlet passage. This chamber achieves thermal isolation of the outlet part of the screw which must be kept hot, and the drive shank of the screw, which is advantageously kept cool for proper operation of the reduction gears. With this air chamber there is advantageously combined a liquid cooling device for the outer end of the screw shank. This cooling contributes to the formation of an effective seal against escape of the molten plastic, without detrimental effect upon the high temperature level of the output passage.

With the foregoing features combined it has become possible to achieve a vertical extruder of large bore, e.g., with greater than four-inch diameter screw, in a practical height, for instance a screw height of no greater than 12 or 14 diameters.

The invention also features an outer seal member forming the restricted sealing passage about the shank, the outer member having helical threads in its stationary inner surface, the direction of the threads being upward in the direction of rotation of the screw. This structure permits the seal assembly to be inexpensive relative to prior proposals of threads in the screw shank in the seal region, while successfully resisting the tendency of molten plastic to escape outwardly along the shank.

Still another feature with the bearing-mounted shank of the extruder screw at the outlet end, is a restricted sealing passage which tapers, widening in the direction away from the end of the screw, which is found to accommodate eccentricity of the screw during its operation under load, without detrimental wear or harm to the integrity of the seal. This feature also contributes to the practical success of large diameter extruders driven from the output end.

Other objects, features, and advantages will appear from the following description of a preferred embodiment of the invention, taken together with the attached drawings thereof, in which:

FIG. 1 is an overall view, partially broken away, of apparatus for reclaiming scrap;

FIG. 2 is a perspective view, partially in section, showing the helical extruder screw and the inside surface of the feeder barrel of the vertical extruder shown in FIG. 1;

FIG. 2a is a diagram representing examples of different flakes;

Figure 3:
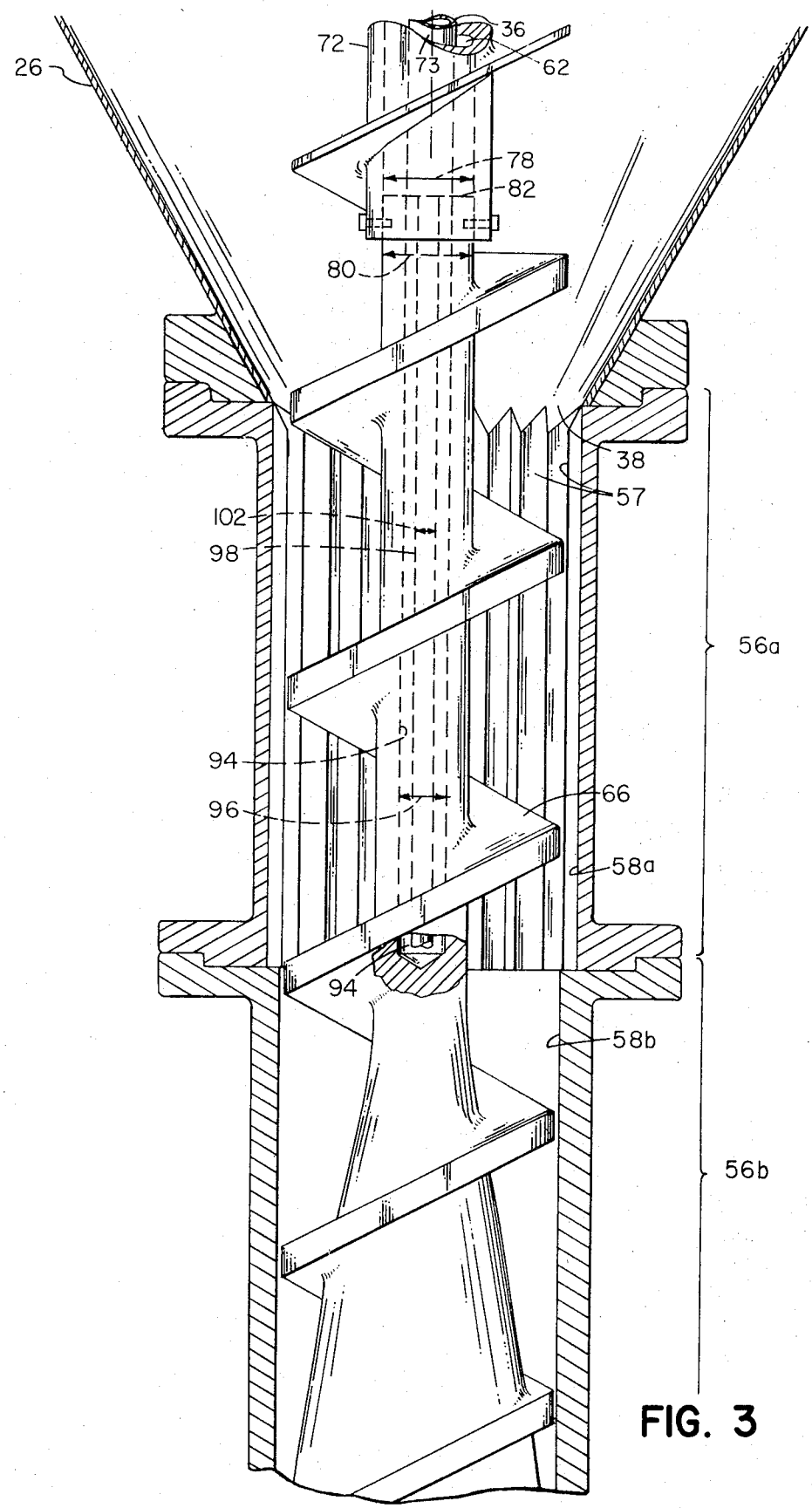
Figure 4:
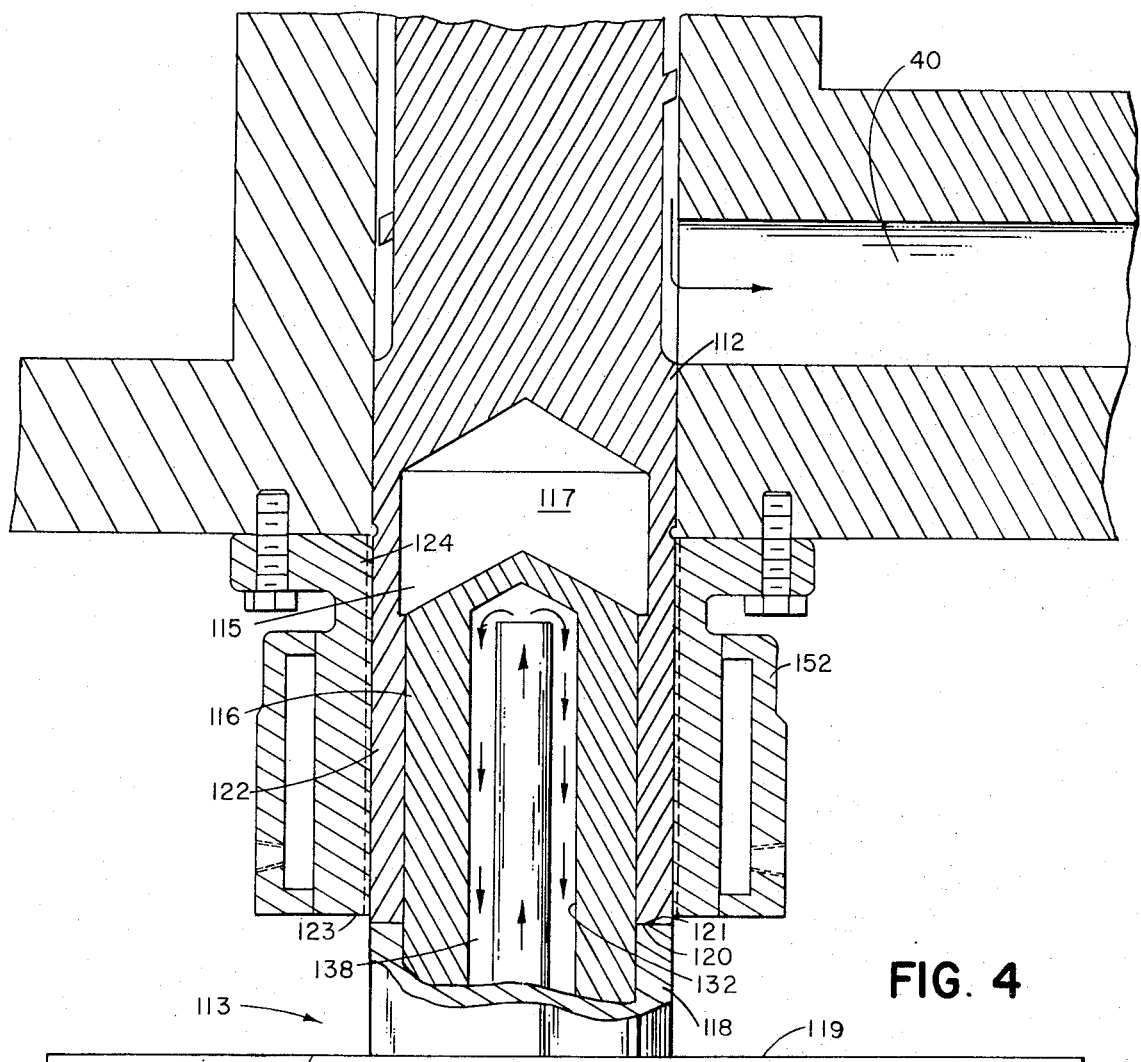

FIG. 3 is a perspective view (with the extruder barrel in cross section taken along line 3—3 of FIG. 1), showing the helical extruder screw in the feeder hopper, feeder barrel, and transition zone of the extruder; and FIG. 4 is a cross-sectional view, taken along line 4—4 of FIG. 1, partially broken away, showing the cooling and thermal isolation chamber within the shank near the drive end and output passage of the extruder; and FIG. 5 is a view of the sealing arrangement near the shank.

Referring to FIG. 1, grinder 10 is arranged to receive large sheets of plastic films and to cut them into flakes, called "fluff." These flakes may range in size for instance from a diameter ¼ inch to ¾ inch and have the thickness of the original film or sheet, e.g., 0.0005 inch to 0.010 inch, examples of various flakes being shown in FIG. 2a. Such flakes may be produced with conventional grinders using screens with hole sizes ranging from ½" to 1½" diameter. The output 12 of grinder 10 is connected by pipe 14 to the input 16 of blower 18, the output 20 of which is connected to cyclone 22 by pipe 24.

Blower 18 receives fluff from grinder 10 and blows the fluff up pipe 24. Cyclone 22 which receives the fluff is mounted upon conical hopper 26 and has an opening 28 forming an inlet into hopper 26. It also has air return pipe 30 arranged to return air to grinder 12 and blower 18.

Vertical extruder 32 is mounted (on base 34) directly below hopper 26 with longitudinal axis 36 concentric with hopper 26, has inlet 38 from hopper 26 and output 40 to die 42, and due to this arrangement and the features to be described, it receives fluff from hopper 26, forces the fluff downwardly under pressure and melts it, and issues molten plastic through output 40 to die 42. Trough 44 is arranged to receive molten plastic strands from orifice 46 in die 42 and to cool the plastic strands with water. Pelletizer 48 pulls the cooled plastic from trough 44, through drier 50, to grind the plastic into pellets, and to deposit the pellets in container 52. Control panel 54 controls heating and cooling temperatures. The pellets from this process may now be treated as fresh stock useful with other extruders. Equally, the output of the extruder may be employed directly in forming articles, sheet or film.

Extruder 32 has barrel 56 which in addition to the feeder barrel portion 56a to be described, also has conventional transition barrel portion 56b, and metering barrel portion 56c. The inner surface 58a of feeder barrel portion 56a has a number of parallel 90° (see angle α) grooves 57 cut immediately adjacent to each other and extending parallel to axis 36 over the entire length of portion 56a. The inner surface 58b of portion 56b and the inner surface (not shown in detail) of portion 56c are smooth.

A plurality of surrounding heater bands 59 are spaced along the plasticizing portions of the extruder, sections 56b and 56c, to maintain the usual high temperature necessary for melting the plastic, e.g., 350 to 375° F.

The screw 60 with a machined helical flight 66 is rotatably mounted concentric with axis 36 on bearings (not shown) in base 34. An upper portion of the screw, 60a, having a hollow root defining chamber 62, extends through the feeder section 56a and extends upwardly through inlet 38 into hopper 26. The effective outer diameter 64 (FIG. 2) of the screw 60 is slightly smaller than the inner diameter 70 of barrel 56a.

Hollow pipe 72 forms an upper extension of the screw and is rotatably mounted by bearing 74 on top 76 of hopper 26. It has inner diameter 78 (FIG. 3) slightly larger than the outer diameter 80 of the upper end 82 of screw 60 over which it fits. It carries helical agitator 84 and upper agitator bar 86, and is arranged to be rotated by screw 60. Pipe 72 and internal pipe 73 extend upwardly to rotary seal 88 with stationary pipes 90 and 92 which are connected to a water storage and cooling tank (not shown). The cylindrical hollow chamber 62 (FIG. 3) extends throughout the length of barrel portion 56a. Hollow chamber 62 has cylindrical wall 94 of diameter 96.

Pipe 98 disposed within and concentric with hollow portion 62, has smaller outer diameter 102 than inner diameter 96. Thus inner pipes 98, 73 and 92 form in their insides an internal passage for flow of cooling liquid in one direction through the feed portion of the screw (corresponding to feeder barrel portion 56a), while a passage for flow in the opposite direction is provided on the outsides of these pipes. Cooling liquid in these passages cools by conduction screw 60 and its flight 66 in feeding portion 56a without cooling lower portions of the screw.

From the feeder section 56a downward to outlet 40 is the working length of the screw (transition section 56b and metering section 56c). In this embodiment the heater bands 59 spaced along this length are adapted to maintain temperatures of 350° F. and above, for instance for extrusion of polyethylene.

At the lower end of this extruder the shank 112 of screw 60 extends beyond the plastic outlet 40 to the drive means 113. It has hollow air-containing insulating chamber 117 which is in turn above and adjacent cylindrical hollow portion 115, the latter filled by a cooling member 116 which defines the lower end of the insulating chamber 117. The air-filled chamber 117 is slightly separated from output 40 by a solid portion of screw 60.

Hollow cylindrical shaft 118, a lower extension of member 116, is mounted in the gearbox 119 by bearings (not shown), and has annular surface 120 arranged to mate with base 121 of screw 60. Portion 122 is shrunk-fit around portion 116 and arranged to transmit torque applied (to shaft 118) to screw 60 and provides annular leakage path 123 for plastic which leaks between screw 60 and surface 124.

Outer pipe 126 and inner supply pipe 127 extend from a water pump (not shown) to 90° bend 128 and into rotary seal 130, making flow connection with annular space 138 between pipe 127 and surface 132 to provide a return path to the water storage and cooling tank for water pumped through pipe 127 in accordance with the arrows shown.

Referring to FIG. 5 the bore 150 of sealing ring 152 tapers, decreasing in diameter inwardly, to define a restricted sealing passage while permitting eccentricity of upper portions of the screw. Screw threads 154 formed in the bore surface are found to have a sealing effect, tending to apply an upward force on plastic which turns with the screw shank. These threads may be ¼" pitch rectangular threads, ⅛" lands and grooves, with clearance varying from 0.001 to 0.005 " over a four inch length from bottom to top of the seal. The depth of the grooves may be 1/32".

In operation the controls on panel 54 are set to the desired temperatures, grinder 10, blower 18, extruder 32, drier 50, pelletizer 48, and the water pump are turned on. Material to be extruded (for example, scrap plastic film to be reclaimed) is placed in grinder 10 where is is ground into fluff. The fluff descends from grinder output 12 into blower 18 through pipe 14 and input 16 and is blown through pipe 24 into cyclone 22. Air is recirculated from cyclone 22 through pipe 30 to grinder 10 and blower 18. The fluff is whirled about in cyclone 22 and descends under the force of gravity through opening 28 into hopper 26, whereupon it is agitated by agitators 84 and 86 as it descends within hopper 26.

The fluff flakes compact easily due to their parallel alignment and the effect of gravity. Screw threads 66 draw the fluff which has been agitated into feeder barrel portion 56a. Gravity helps to insure the total immersion of threads 66 by the fluff and the vertical construction ensures an even flow of the fluff. Experiments with the combination of the rotation retarding grooves 57 cut in the inner surface of feeder barrel portion 56a, the cooling effect of the water pumped through the feeder portion of the screw, in a vertical extruder as shown, proves that the fluff is prevented from conglomerating, blocking and turning with the screw over a wide range of conditions. For optimum results, grooves 57 should be wide at their inner periphery to permit the fluff to descend through portion 56a under the pressure exerted by threads 66. For best results known to date the surface area of grooves 57 should be arranged substantially around the entire inner surface area of portion 56a (preferably more than about 10 grooves) to increase the quantity of fluff passing through portion 56a, and the effective diameter 64 of threads 66 should be substantially the same as effective inner diameter 70 of portion 56a to increase the positive driving effect of threads 66 pushing the fluff downward. The cooling of top 82 also prevents heating of the fluff caused by the relative movement between threads 66 and the fluff and heat from being conducted from lower portions of the extruder, while grooves 57 (which advantageously are parallel to the direction of movement of the fluff) retard the fluff from turning with threads 66 as it descends. As the fluff is forced further into barrel 56, it passes from feeder barrel portion 56a into transition barrel portion 56b where it is heated. The fluff melts as it is gradually forced down into portion 56b and it passes through metering barrel portion 56c and output 40 into die 42 whereupon it issues, for example, in the form of strands or a sheet from opening 46 into cooling trough 44. It is drawn by pelletizer 48 through drier 50, enters pelletizer 48, is formed into pellets, and the pellets are deposited in container 52. The pellets thus produced or reclaimed are amenable to extrusion by ordinary processes (e.g., with a standard horizontal extruder).

The water pumped through pipe 127 into cooling member 116 quenches leakage of material through the rotary seal. Air filled chamber 117 insulates member 116 from the heat in barrel portion 56c and prevents portion 56c from cooling to the extent that the molten plastic will begin to harden before it enters die 42.

While various of these features are useful in horizontally arranged extruders, the most advantageous arrangement, and one which permits operation on fluff over a wide range of physical characteristics is the preferred vertical extruder just described.

Other embodiments will occur to those who are skilled in the art and are within the following claims.

I claim:

1. In an extruder for extruding scrap plastic and the like comprising a hopper, a heated extruder barrel containing an extruder screw and a drive means for said screw, wherein said extruder has a feeder comprising initial portions of said barrel and screw, said initial screw portion having means for liquid cooling, the internal surface of said initial barrel portion having rotation retarding means extending along the length thereof, said barrel extending upwardly, with said feeder at the upper end, and opening upwardly to receive plastic from said hopper, said extruder being vertically arranged, said drive means being mounted at the base of said extruder, the shank of said extruder screw extending beyond the outlet of said extruder to said drive means, said shank being hollow and defining an insulating air-containing chamber closely adjacent the level of said outlet.

2. The extruder of claim 1 including means for cooling the portion of said shank below said insulating air-containing chamber.

3. The extruder of claim 2 including a plug inserted into the hollow lower end of the shank, said plug containing liquid passages defining said means for cooling.

4. The extruder of claim 3 including a seal means surrounding said cooled portion of said shank, said seal portion having a clearance from the outer surface of said shank which decreases downwardly.

5. In an extruder assembly having means driving the screw from the discharge end, said screw having a shank protruding from the barrel, said shank being hollow and defining an air-containing isolation chamber in the region close to the outlet of said extruder, and means to cool the outer end portion of said shank; the assembly in the form of a short, effective extruder, the feeder portion of said extruder including means to cool the feeder portion of the screw, and means to heat the transition and metering portions of said extruder.

* * * * *